(12) United States Patent
    Anderson

(10) Patent No.: US 9,970,294 B2
(45) Date of Patent: May 15, 2018

(54) SHOCKWAVE ROTOR DETONATION (OMNI-ENGINE, UBIQUITOUS X ENGINE) MULTIPURPOSE ENGINE

(71) Applicant: Isaac Erik Anderson, Evergreen, CO (US)

(72) Inventor: Isaac Erik Anderson, Evergreen, CO (US)

(73) Assignee: Isaac Erik Anderson, Evergreen, CO (US)

( * ) Notice: Subject to any disclaimer, the term of this patent is extended or adjusted under 35 U.S.C. 154(b) by 295 days.

(21) Appl. No.: 13/937,188

(22) Filed: Jul. 8, 2013

(65) Prior Publication Data

US 2014/0007837 A1    Jan. 9, 2014

Related U.S. Application Data

(60) Provisional application No. 61/690,956, filed on Jul. 9, 2012.

(51) Int. Cl.
| | |
|---|---|
| F02B 53/00 | (2006.01) |
| F02C 5/00 | (2006.01) |
| F02C 5/12 | (2006.01) |
| F01C 21/00 | (2006.01) |
| F02C 5/02 | (2006.01) |
| F01C 1/22 | (2006.01) |
| F23R 7/00 | (2006.01) |
| F01C 21/08 | (2006.01) |

(52) U.S. Cl.
CPC ............... *F01C 21/00* (2013.01); *F01C 1/22* (2013.01); *F02C 5/00* (2013.01); *F02C 5/02* (2013.01); *F01C 21/08* (2013.01); *F23R 7/00* (2013.01)

(58) Field of Classification Search
CPC .... F01C 21/00; F01D 1/34; F02C 5/02; F02C 5/00; F02K 7/02; F23R 7/00
USPC ............. 123/559.3, 205, 208; 60/247, 39.38, 60/39.34, 39.42, 39.76, 39.37
IPC .......................................................... F01D 1/34
See application file for complete search history.

(56) References Cited

U.S. PATENT DOCUMENTS

| | | | | | |
|---|---|---|---|---|---|
| 820,238 | A | * | 5/1906 | Moss ........................... | 60/39.38 |
| 1,187,293 | A | * | 6/1916 | Faurot ......................... | 60/39.38 |
| 1,299,330 | A | * | 4/1919 | Groves ........................ | 60/39.38 |
| 2,547,560 | A | * | 4/1951 | Brodzinsky ................. | 60/39.76 |
| 2,943,450 | A | * | 7/1960 | Willson .................. | F02B 75/26 |
| | | | | | 60/39.34 |

(Continued)

FOREIGN PATENT DOCUMENTS

| | | | | | |
|---|---|---|---|---|---|
| CN | 101718226 | A | * | 6/2010 | ............... F02K 7/08 |
| DE | 2303470 | A1 | * | 8/1974 | ............... F01D 1/34 |

(Continued)

*Primary Examiner* — Thai Ba Trieu

(57) ABSTRACT

This is an engine that uses combustion pressures and shock waves to provide moment about an axis on a rotor producing a torque. This engine is a torque driven power plant which can be used for a variety of energy applications. At the core of this engine is a large diameter right cylinder that uses internal vectored combustion to rotate a shaft that can be attached to various mechanisms for use in diverse applications. This engine can be scaled to be various sizes with the functionality of the engine unaffected. This engine has a unique internal rotational-recoil disk (piston head type) that rotates in a circle making it extremely efficient. This engine has directional intake valves and removes the exhaust through the center of the rotation-recoil disk.

13 Claims, 18 Drawing Sheets

(56) References Cited

U.S. PATENT DOCUMENTS

| | | | | |
|---|---|---|---|---|
| 3,130,546 A | * | 4/1964 | Hovorka | 60/804 |
| 3,712,274 A | * | 1/1973 | Craft | 60/39.44 |
| 4,807,440 A | * | 2/1989 | Salem | 60/39.76 |
| 4,835,960 A | * | 6/1989 | Skoczkowski et al. | 60/39.34 |
| 6,035,630 A | * | 3/2000 | Soos | 60/39.76 |
| 6,810,678 B1 | * | 11/2004 | Luk | F01C 1/44 60/800 |
| 7,614,211 B2 | * | 11/2009 | Chapin et al. | 60/39.38 |
| 8,448,417 B1 | * | 5/2013 | Farber | 60/39.34 |
| 2013/0327010 A1 | * | 12/2013 | Muller | F02C 3/165 60/39.01 |

FOREIGN PATENT DOCUMENTS

| | | | | | |
|---|---|---|---|---|---|
| DE | 4326720 A1 | * | 2/1995 | | F01D 1/34 |
| DE | 19525268 A1 | * | 1/1997 | | F01D 1/34 |
| DE | 102004020042 A1 | * | 11/2005 | | F01D 1/34 |
| FR | 867003 A | * | 9/1941 | | F01D 1/34 |
| GB | 569329 A | * | 5/1945 | | F01D 1/34 |
| JP | 04279727 A | * | 10/1992 | | |

\* cited by examiner

SHOCKWAVE ROTOR DETONATION (OMNI-ENGINE, UBIQUITOUS X ENGINE) MULTIPURPOSE ENGINE

CROSS-REFERENCE TO RELATED APPLICATION

This application is claiming the benefit of priority to the Provisional Patent No. 61/690,956 filed on Date Jul. 9, 2012, by Isaac Erik Anderson.

BACKGROUND OF THE INVENTION

Internal combustion engine pertains to inventions in which a combustible material (usually a gas) is ignited within an enclosed space or chamber, most typically following the Otto cycle. Expanding gas from combustion is converted into work by permitting the resulting products of combustion to act upon and through mechanical powers of internal parts, conveying this mechanical energy to external components.

Internal combustion engines offer convenience and reliability in creation of on demand energy production. This makes them highly desired in automotive, aviation, and marine transportation among a variety of applications. Due to increasing fuel costs, a growing demand exists for internal combustion engines with better fuel efficiency. However, only about ⅓ of the chemical potential energy is converted to mechanical energy by reciprocating internal combustion engines.

Beyond improved fuel efficiency, it is highly desirable that internal combustion engines retain an efficient output of torque energy both at high rotation speeds and at lower speeds useful for providing propulsion so that the engine may be used both to initiate movement as well as maintain velocity at cruising speeds. It is further desirable to achieve these results utilizing this internal combustion engine which does not require a dedicated exhaust configuration or stroke, complex valve arrangements, cyclically loaded moving parts, and a non-continuous momentum, and multi-directional fuel-exhaust flows. Minimizing carbon emissions is also desirable.

The present invention addresses these concerns by providing a continuous momentum direction of the internal components and uni-directional fuel-exhaust flow. The invention substantially reduces the number of moving parts required in the combustion process and that required to transmit mechanical energy. Fewer required parts allow this engine to be light weight, easier to fabricate, lower in cost, and more compact.

Some of the engines that are similar in some ways to this design are the Wankle engine (U.S. Pat. No. 5,305,721) and the Wave Rotor Engine (U.S. Pat. No. 6,460,342). These engines are only similar in regard to the usage of a rotary type compression-combustion zone. The combustion element of this invention is a unique pressure-shock wave (detonation) rotor-recoil system.

BRIEF SUMMARY OF THE INVENTION

Some advantages of this engine:
1. Efficiency—continuous internal circular motion of rotor and reduced number of parts over current models.
2. Cost reduction—increased affordability due to reduction in time and materials needed in fabrication.
3. Portability—lightweight due to compactness and a reduction of parts.
4. Exhaust Removal System—allowing for effective quick exhaust removal.
5. Manufacturing and Maintenance Complexities—fewer parts than Wankle and reciprocating piston engines.
6. Safety—uni-directional flow of fuel and exhaust through the engine help reduce safety hazards.

It is the intent of most all versions of internal combustion engines to convert thermal energy to mechanical and to do it as efficiently as possible. Reciprocating internal combustion engines have become the mainstay in this endeavor and while their efficiency has greatly improved since the time of their introduction there remains considerable energy waste due to opposing (reciprocating) motions of the pistons. A key motivation in the development of the Wankle engine (U.S. Pat. No. 5,305,721) was to reduce this energy waste with the design of a piston maintaining a continuous directional motion. However, both the reciprocating and Wankle engines lose energy in the reciprocating or eccentric motion of pistons (respectively) and compression phases of pistons where the air-fuel mixture is compressed prior to ignition.

The Wankle, turbine-type, wave rotor (U.S. Pat. No. 6,460,342) and pulsejet (U.S. Pat. No. 6,216,446) engines all take advantage of continuous motion resulting from combustion but each have characteristics which determine their utility in application. Turbine and wave rotor engines can deliver a lot of power but take considerably more time to reach new power settings in contrast to the Wankle versions. Pulsejet engines can respond quicker to new power settings but like turbines, lose some power since combustion is not as confined as it is in piston type engines. The new development presented here has a rotating piston like the Wankle and similarly confines combustion in contrast to the turbine, wave rotor and pulsejet engines. However, unlike the Wankle, the rotary piston described in this patent rotates as a perfect circle without the asymmetry in the Wankle types. Because of the asymmetrical piston, combustion chamber, and moving gaskets, sealing in the Wankle engine's combustion chamber is complex. For the most part, this problem remains with all Wankle versions and why the engine is seldom seen in commercial applications including the auto industry. Additionally, the Wankle's shape causes increased stress on the gears, wearing them down resulting in costly repetitive repairs. Thus, there are many advantages of my engine design over the Wankle types, in particular, the avoidance of high compression gasket ware due to asymmetric rotor rotation. Fewer moving parts can reduce the amount of repairs due to wear and reduces the cost of fabrication. Also, another direct advantage to this engine is the exhaust removal system. Unlike most conventional engines, this engine is designed to remove the exhaust through the center of the engine (through the rotor-recoil disk as described in claim 1). In contrast to reciprocating engines, this engine does not need a cycle dedicated only to exhaust removal. This means that the engine can use nearly the full original torque energy, generated through combustion, to be a direct output thus enabling the efficiency of the engine to be substantially better. The advantage of my engine over the turbine types is a more rapid response to power settings and the better efficiency provided by the use of a confined combustion zone.

A variety of fuels could be used with this engine depending on the fuel delivery system outfitted to it. The engine can run as a zero-carbon emitter with a hydrogen-oxygen fuel mixture. When using a hydrogen-oxygen fuel mixture, this engine can be easily outfitted to include a self-cooling system. It does this by circulating water through the engine close to the areas of combustion. The coolant is then removed from the internal combustion component of the engine and stored in a container where it can be electrolyzed and turned into $H_2O_2$ mixture.

The combustion chambers in this engine are intended to be at an offset angle from the center of the rotation of the engine. This is to cause the maximum amount of torque available to rotate the center recoil-disk.

Each of the components in this engine is intended to be minimalistic and simplistic as possible. This is to aid in fabricating and repairing engine components. This ease of repair is an advantage over conventional engines which are substantially more complex due to the great number of components and their individual complexity. In addition, by being relatively simple, each part on the engine can be replaced or interchanged relatively quickly and with less skill.

This engine is also designed to be lightweight and easily scalable for the desired power need. The overall cylindrical shape helps this engine to be compact and capable of fitting into numerous places. The shape also helps the engine to be significantly lighter weight. One version of this engine utilizes a rotor disk and chamber disk composed of 4 chambers (the number of chambers can be varied depending on the power and engine smoothness needed). Designed in a way that is easy to fabricate or manufacture, this engine is divided into sections. Each section is intended to enclose the components completely but may be assembled with ease. Each piece can be fabricated on a mill or lathe. This enables the production of the engine to be relatively easy.

BRIEF DESCRIPTION OF THE SEVERAL VIEWS OF THE DRAWING

Each of the figures depicts the functional parts that make up the engine.

DRAWINGS LIST OF REFERENCE NUMERALS

List of Reference Numerals

Figure 1:
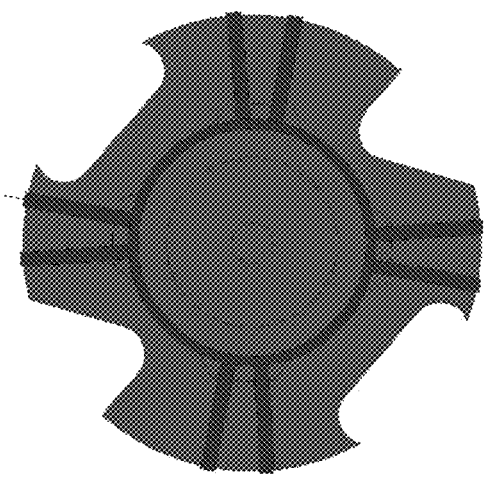
FIG. 1: is a top down view of the Rotor-Recoil Disk with Combustion-Containment Gaskets.
Figure 13:
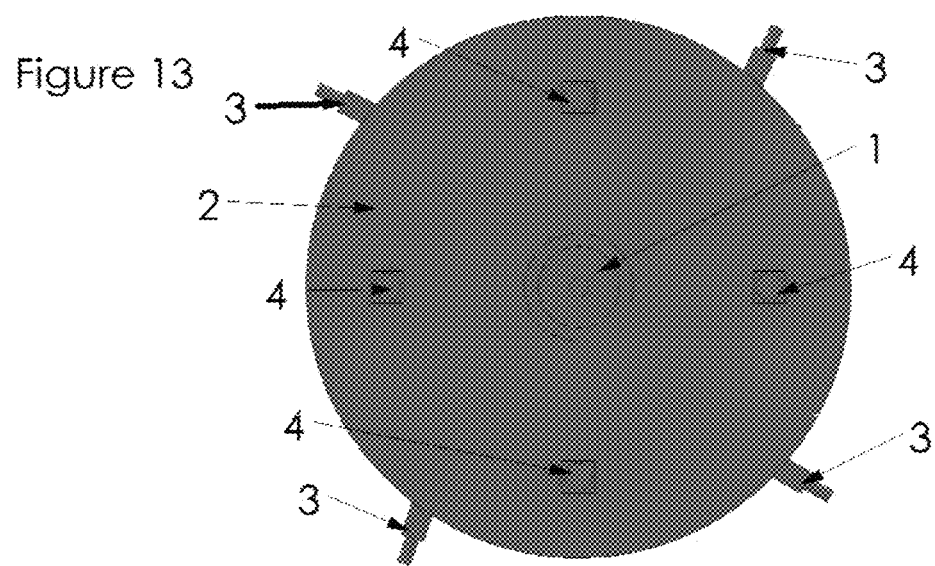
FIG. 13: is a top down view of the complete engine assembly.
Figure 14:
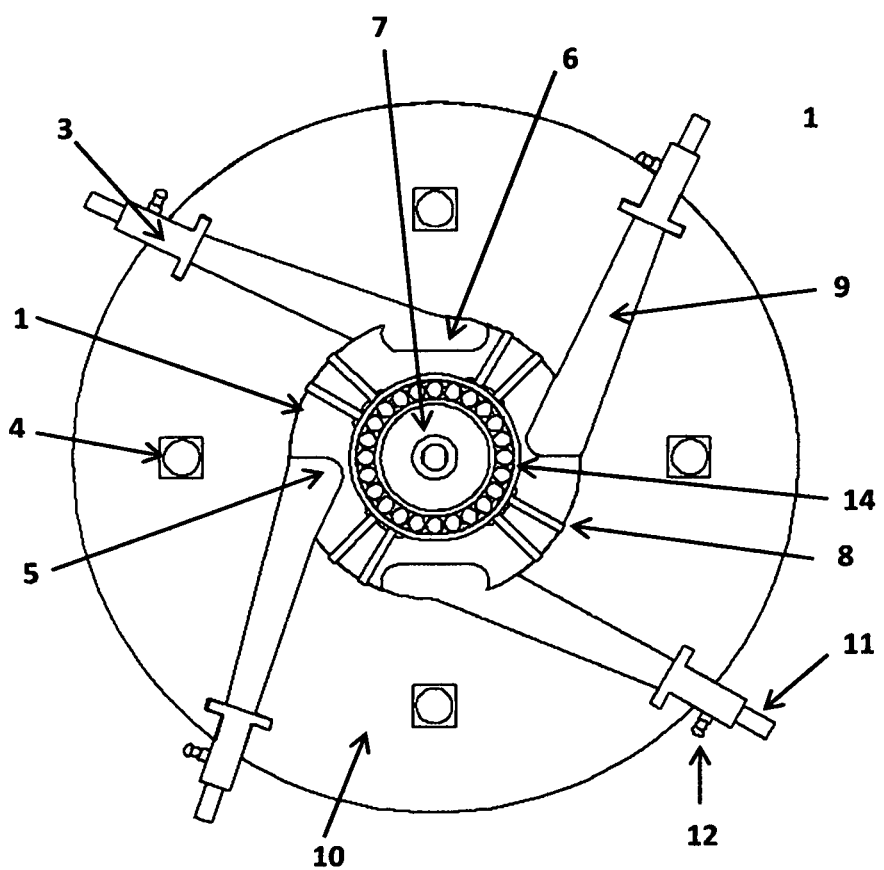
FIG. 14: is a top down view of the engine assembly.

FIG. 13
1) the rotor-recoil disk inside of the enclosed engine;
2) the combustion-containment wall that encloses the engine internal components;
3) the chamber-caps; and
4) the fastening means FIG. 14
1) the rotor-recoil disk inside of the chamber-containment disk;
3) the chamber-caps that are on the end of each chamber;
4) the fastening means
5) the triangular-pyramid used to direct the combustion in the combustion chambers to cause torque about the center of the rotor-recoil disk (1);
6) the bathtub shaped cut outs used to extract exhaust from the combustion chambers;
7) the hole that the exhaust is drawn out of from the combustion chambers, and out of the engine;
8) the combustion-containment gaskets;
9) the combustion-chamber; and
10) the chamber-containment disk.

Figure 15:
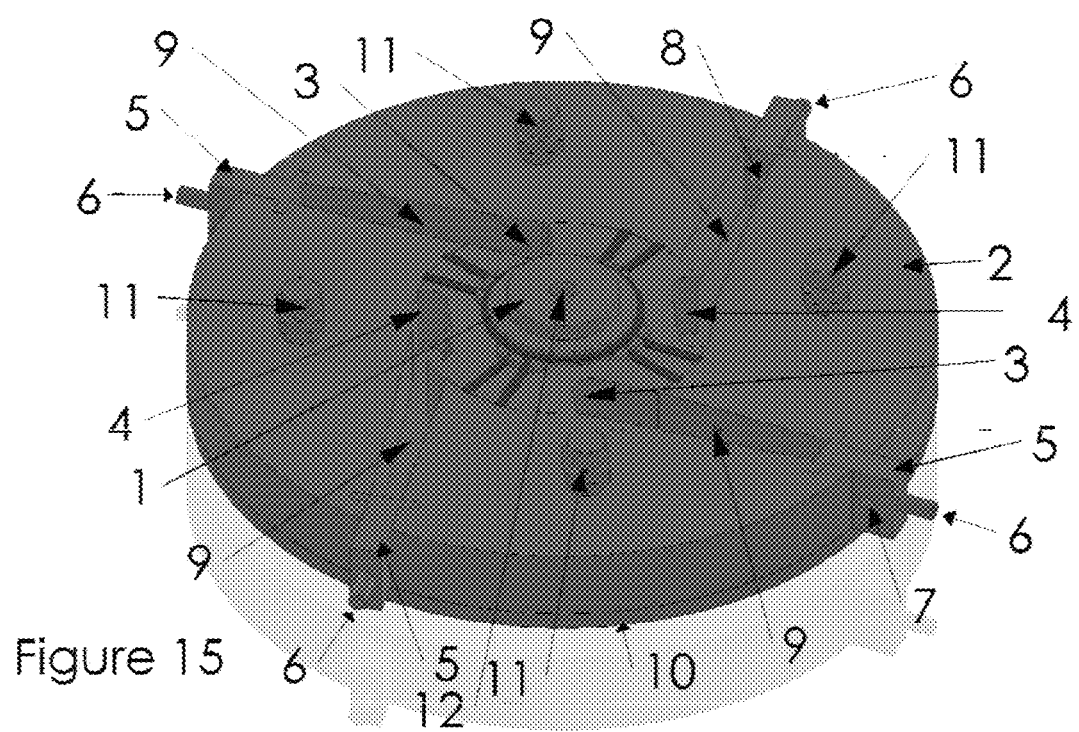
FIG. 15: is an isometric view of the engine assembly.

FIG. 15
1) the rotor-recoil disk
2) the chamber-containment wall;
3) the chamber-caps that are on the end of each chamber;
4) the fastening means;
5) the triangular-pyramid used to direct the combustion in the combustion chambers to cause torque about the center of the rotor-recoil disk;
6) the bathtub shaped cutouts used to extract the exhaust from the chambers;
7) the hole that the exhaust is drawn out of from the chambers, and out of the engine;
8) the combustion-containment gaskets;
9) the combustion chambers;
10) the chamber-containment disk;
11) the fuel intake nozzles on each chamber-cap, which put fuel into each chamber;
12) igniters in the side of each chamber-cap; and
13) the hole in the base of each chamber-cap that allows the fuel and ignition source to reach the rest of the chamber for a full ignition.

Figure 17:
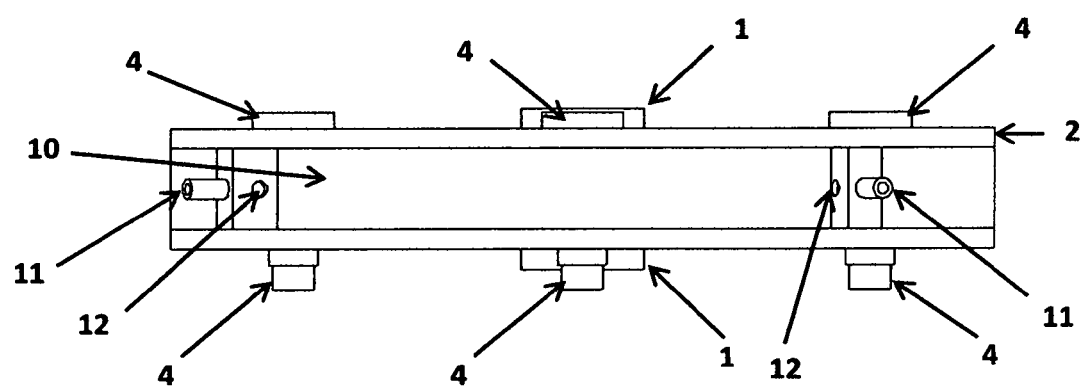
FIG. 17: is a side view of the engine assembly.
Figure 18:
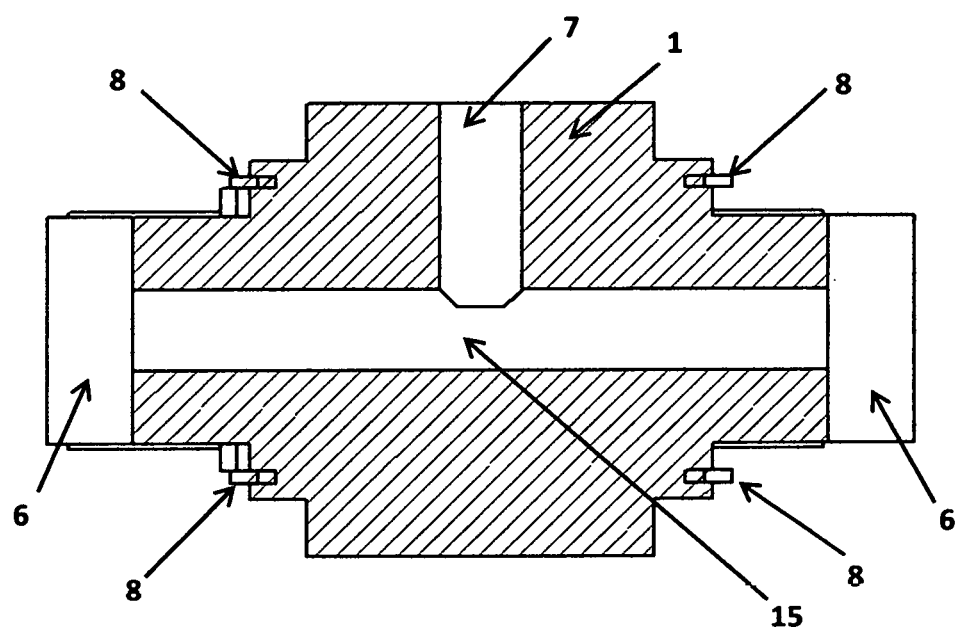
FIG. 18: is a side cross-section view of the rotor-recoil disk.

FIG. 17
1) the rotor-recoil disk inside of the enclosed engine;
2) the combustion containment wall;
3) the chamber-caps that are on the end of each chamber;
4) the fastening means;
10) the chamber-containment disk;
11) the fuel intake nozzles on each chamber-cap, which put fuel into each chamber.
12) igniters in the side of each chamber-cap; and
14) rings of ball bearings;

FIG. 18
1) the rotor-recoil disk inside of the enclosed engine;
5) the triangular-pyramid used to direct the combustion in the combustion chambers to cause torque about the center of the rotor-recoil disk;
6) the bathtub shaped cutouts used to extract the exhaust from the chambers;
7) the hole that the exhaust is drawn out of from the chambers, and out of the engine;
8) the combustion-containment gaskets;
15) T-shaped exhaust channel;

DETAILED DESCRIPTION FIRST EMBODIMENT

FIG. 1: is a top down view depicting the rotor-recoil disk (1) with combustion-containment gaskets (8) and the triangular-pyramid cutout (5) used to direct the combustion in the combustion chambers to cause torque about the center of the rotor-recoil disk (1). Also shown are the bathtub shaped cutouts (6) used to extract the exhaust from the chambers.

Figure 2:
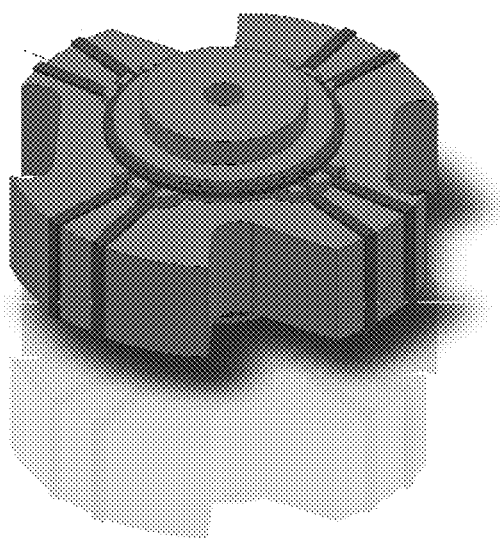
FIG. 2: is an isometric drawing of the Rotor-Recoil Disk.

FIG. 2: is an isometric drawing depicting the rotor recoil disk (1) showing the extraction exhaust removal. Holes are drilled through the center of the rotor-recoil disk (1).

Figure 3:
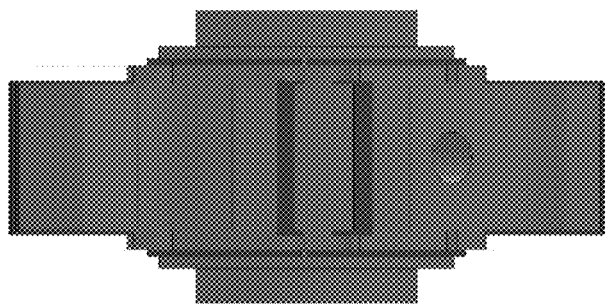
FIG. 3: Is a side view drawing of the Rotor-Recoil Disk.

FIG. 3: is a side view drawing depicting the rotor-recoil disk (1) showing both sides of the rotor-recoil disk (1) as well as the exhaust-extraction holes in the center of the exhaust removal cutouts (6).

Figure 4:
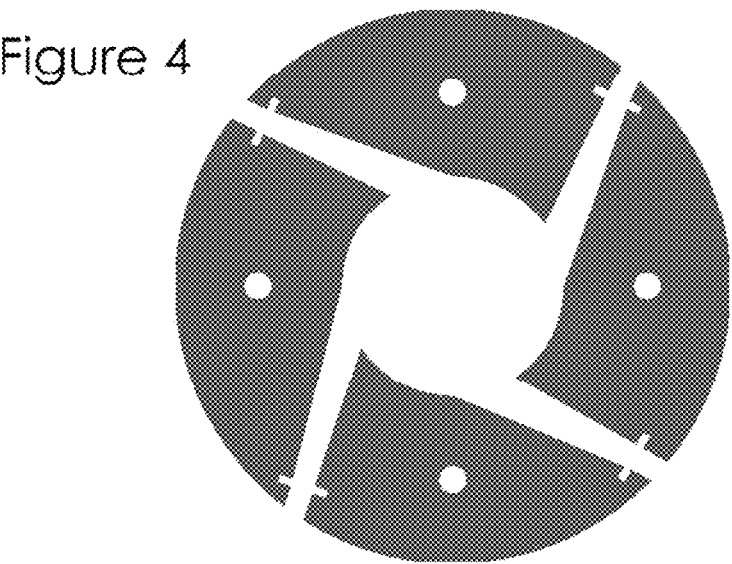
FIG. 4: is a top down drawing of the Chamber-Containment Disk.

FIG. 4: is a top down drawing depicting the chamber-containment disk (10) with the chamber cutouts (5) as well as the holes cut for the rotor-recoil disk (1) and the fastening means holes (4).

Figure 5:
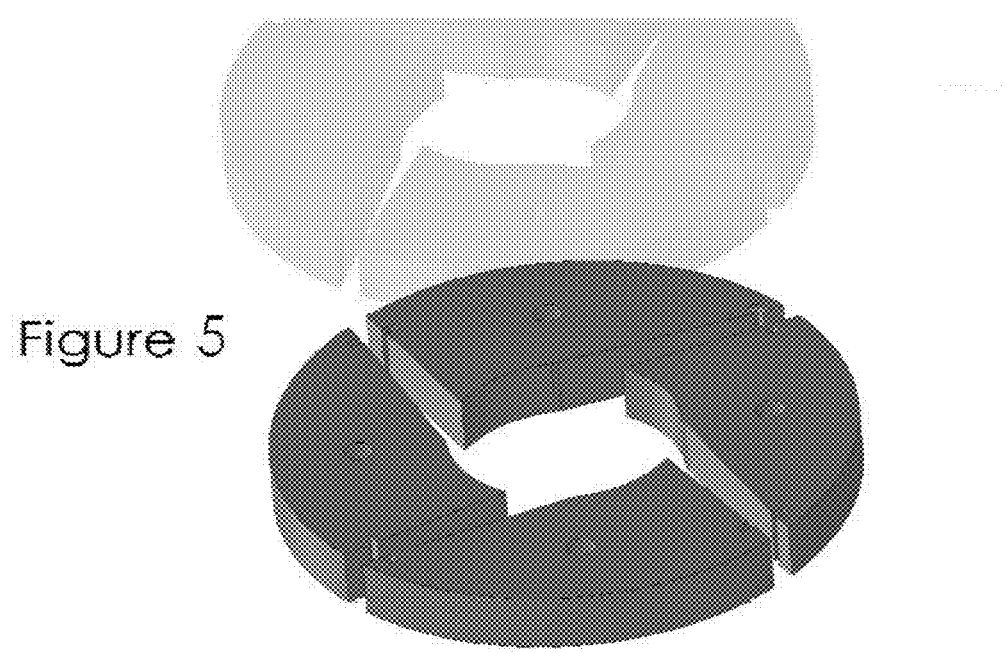
FIG. 5: is an isometric drawing of the Chamber-Containment Disk.

FIG. 5: is an isometric drawing depicting the chamber-containment disk (10) exaggerating the various shapes in the combustion-chambers that help contribute to the vectorized combustion shock wave that goes to the rotor-recoil disk (1).

Figure 6:
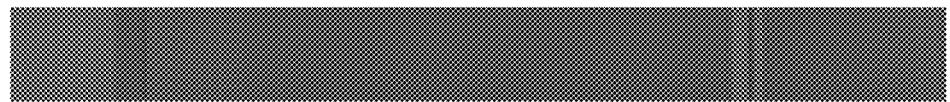
FIG. 6: is a side view drawing of the Chamber-Containment Disk.

FIG. 6: is a side view drawing depicting the thickness of the chamber-containment disk (1).

Figure 7:
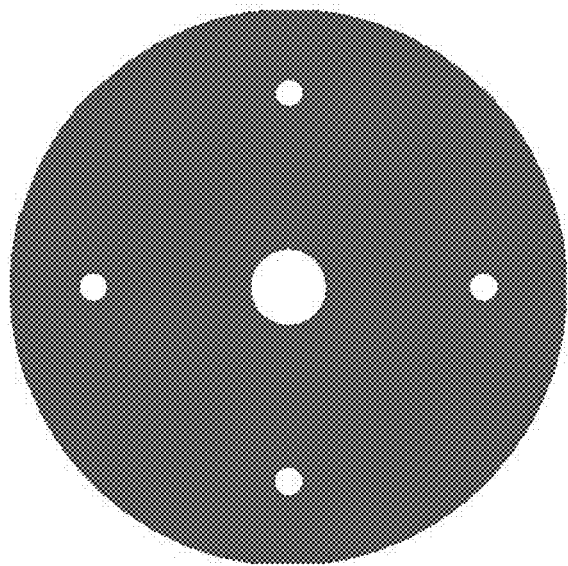
FIG. 7: is a top down drawing of the Combustion-Containment Wall.

FIG. 7 is a top down drawing depicting the combustion-containment wall (2) with holes for the fastening means (4), and the hole for the rotor-recoil disk (1) (the center hole) which is the diameter of the small shaft that protrudes from either side of the rotor-recoil disk (1) (this forms a seal between the rotor-recoil disk and the combustion-containment walls)

Figure 8:
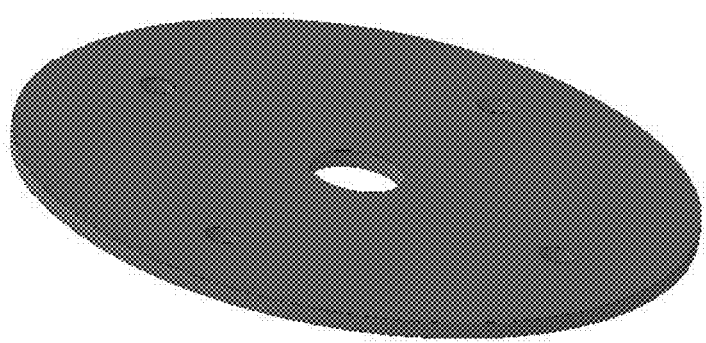
FIG. 8: is an isometric drawing of the Combustion-Containment Wall.

FIG. 8: is an isometric drawing depicting the combustion-containment wall (2) exaggerating the thickness of the piece.

Figure 9:
FIG. 9: is a side view drawing of the Combustion-Containment Wall.

FIG. 9: is a side view drawing depicting the combustion-containment wall (2)

Figure 10:
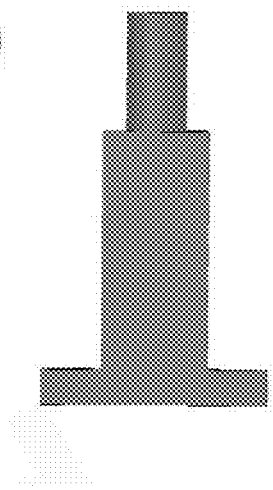
FIG. 10: is a top down drawing of the Chamber-Cap.

FIG. 10: is a top down drawing depicting the chamber-cap (3), showing the notches at the base of the piece, that are meant to fit into the chamber-containment disk's combustion-chambers' end. At the top of this piece it is a cylinder, which is intended to fit onto a tube or a source to allow fuel to enter the combustion-chambers. Towards the base of this piece it becomes a rectangular cube; this is to allow a spark plug to be put into the side of the piece to allow for ignition.

Figure 11:
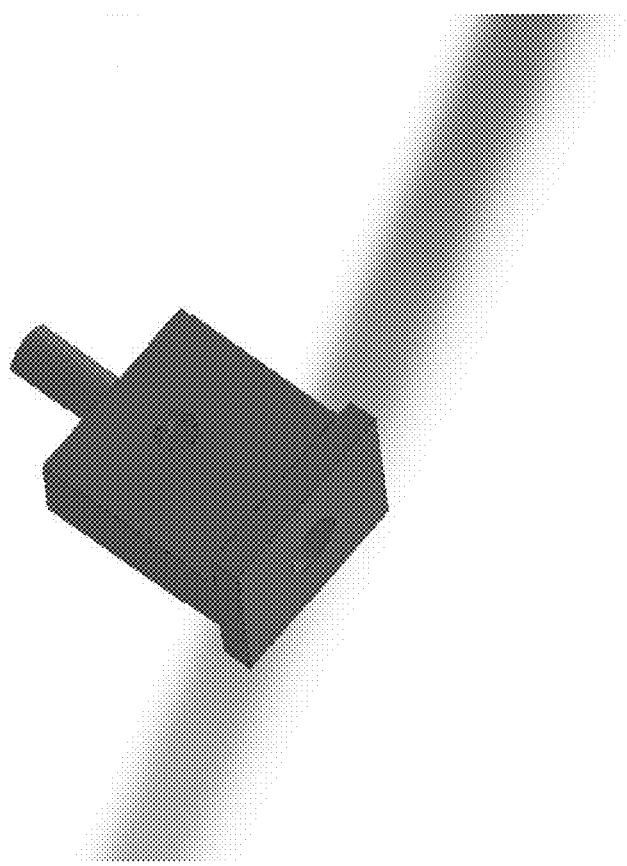
FIG. 11: is an isometric drawing of the Chamber-Cap.

FIG. 11: is an isometric drawing depicting the chamber-cap (3). In this view the spark plug hole is seen in the middle of the piece, and the hole that continues to the combustion-chamber is show towards the bottom of the piece. This is intended to show the different holes that allow for fuel intake, ignition source and the area where the combustion shock wave travels towards the combustion-chamber.

Figure 12:
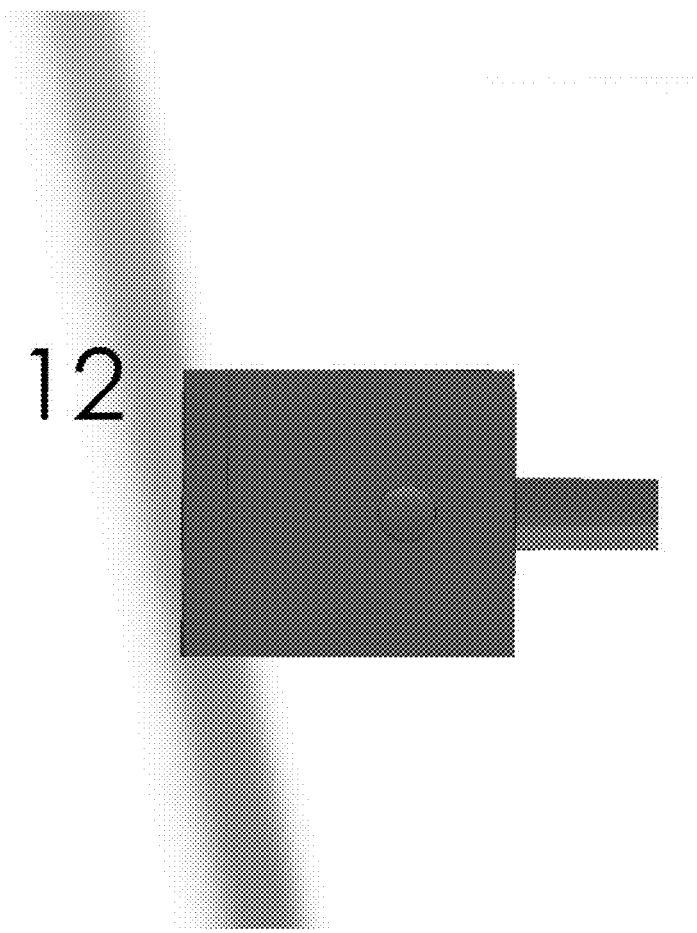
FIG. 12: is a side view drawing of the Chamber-Cap.

FIG. 12: is a side view drawing depicting the side view of the chamber-cap (3). This is intended to show the overall profile of the piece.

FIG. 13: is a top down view of the complete engine assembly. In this assembly the pieces are in a desired configuration to function properly. This also shows one way of fastening and a configuration that the engine is in.

FIG. 14: is a top down view of the engine assembly without one of the combustion-containment walls (2), intended to show the internal configuration of the engine. As shown the rotor-recoil disk (1) is in a configuration whereas the triangular-pyramid shaped cutouts (5) (intended to direct pressure and combustion shock wave to cause torque) is aligned with each combustion-chamber inside the chamber-containment disk (10). This is so that when ignited, the combustion chambers will be aligned with the triangular shaped cutouts to create a torque about the center axis of the rotor-recoil disk (1).

FIG. 15: is an isometric view of the engine assembly without one of the combustion-containment walls (2), intended to show the internal configuration of the engine. This view helps to understand how each internal component fits together to cause a combustion and resultant torque.

Figure 16:
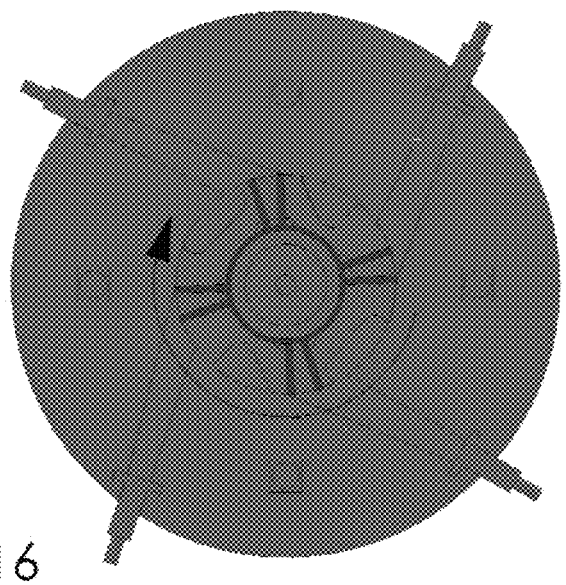
FIG. 16: second position of the rotor-recoil disk inside the engine assembly showing tangential torque.

FIG. 16: Depicts the same diagram as in FIG. 14 however the rotor-recoil disk (1) is rotated to clockwise to the other configuration that the disk can be in during its clockwise rotation inside of the chamber-containment disk (10).

FIG. 17: is a side view of the engine assembly with both of the combustion-containment walls (2), intended to show the overall configuration of the engine. In this view it is easy to see how the rotor-recoil disk's shafts extend beyond the combustion-containment walls (2). This allows attachments to be powered from the end of the rotor-recoil disk (1) on one end and, at the other end, allows exhaust to escape from inside the engine via the T-channel (15) at the center of the rotor-recoil disk (1). This view also shows the location of the rings of ball bearings (14).

FIG. 18: is a side cross-section view of the rotor-recoil disk, illustrating the internal exhaust holes located in the rotor-recoil disk (1), as well as how the exhaust is removed from the bathtub shaped cutouts (6) through the T-shaped channel (15) and out of the exhaust hole (7) and where the combustion-containment gaskets (8) are located for reference.

DETAILED DESCRIPTION OF THE INVENTION

This engine is constructed in a traditional manner and the process of fabrication is not what is unique for patenting. The purpose in discussing one process that can be used for fabrication is for the reader's information only and intended to show that less is required to fabricate this engine.

One of the ways the engine may be machined is from a high temperature aluminum alloy with steel encasing the combustion-chambers, although a range of other metals or materials may be used. Machining of engine parts may be done with a lathe and milling machine. As an arbitrary beginning, this discussion of the fabrication process starts with the creation of the rotor-recoil disk (1). The disk's varying diameters may be fabricated from a solid cylinder of aluminum or steel (although other materials are also suitable) using a lathe. Complex forms and cutouts that cannot be turned on a lathe can be cut on a milling machine. The more complex areas include the combustion-recoil triangular-pyramid cutouts, the bathtub shaped exhaust-extraction cutouts, and the exhaust-extraction holes (15).

As stated above, this is one of a variety of ways this engine can be fabricated. The chamber-containment disk (10) can be fabricated from flat plate stock. On the lathe this plate maybe cut into a disk shape of a desired radius. A hole in the center is cut with a lathe to a diameter that is slightly larger than the diameter as the rotor-recoil disk. This will allow the rotor-recoil disk to fit inside of the chamber-containment disk. Once both diameters are faced and trimmed to desired specification, the piece may be milled for more complex cuts. Rotor disk cutouts and exhaust channels are cut into the disk. The first cutouts in this version of the engine can be rectangular shapes cut ¾ the thickness of the chamber-containment disk. Starting at the outside edge, these cutouts are cut at a 25 degree angle from the diameter line (center) of the chamber-containment disk/cylinder. If two combustion and two exhaust cutouts are desired, each is cut every 90 degrees of arc around the face of the piece. In this version of the engine there would be four chambers. The number of chambers created may vary per power and other requirements. Once the cutouts are milled, four holes are drilled 45 degrees from the chamber cutouts so as to be equally spaced between cutouts. These holes are for bolts to fasten the engine together.

The next pieces to be fabricated are two combustion-containment walls (2). They are fabricated from a metal plate that is ¼th the thickness of the chamber-containment disk. These are first turned and trimmed on a lathe until the outside diameter matches that of the chamber-containment disk. Once they have the same diameter, an inner hole is cut in the middle of this piece (similar to the chamber containment disk). This hole has the same diameter as the shaft that comes off the rotor-recoil disk. This will allow the rotor recoil disk to fit tightly with the combustion-containment wall. A seal will prevent gas from escaping the combustion area of the engine.

Chamber-caps (3), one per chamber, will be fabricated in the form of a rectangular cube or other shape compatible with the chamber. The end of this piece is formed into a tube shape fitting using a lathe. On a mill, the lengthwise dimension of the tube shape fitting is drilled out down its center. In the middle of the largest flat area on the rectangular cube is drilled another hole that meets the hole that runs the length of the piece. This new hole is then threaded to fit a spark plug or other igniter.

Lastly, gaskets (8) (or another form of sealing means) are placed on either side of the combustion-containment wall (2), sandwiching either side of the chamber-containment disk (10). These gaskets (8) can be cut identical to the way that the combustion-containment walls are cut. By doing so, they fit on either side of the combustion chambers to prevent any gasses from escaping the combustion area.

Assembly

First place the chamber-caps (3) into each chamber on the chamber-containment disk (10). Then place the rotor-recoil disk (1) into the chamber-containment disk (10). Next, place the gaskets (8) on either side of the chamber-containment disk (10). Then place the combustion-containment walls (2) on either side and push them on to fit so that the fastening holes line up. Once they line up, place fastening bolts in each hole. Screw igniters (12) into each of the igniter holes on the chamber-caps (3).

Functionality

This engine works by using vectored recoil from combustion events to cause a moment about the center of the rotor-recoil disk (1), thus causing torque.

One way of describing the operational sequence of events is as follows. Fuel is injected through the chamber-caps (3) and into the chamber. An electrical charge is sent to the spark plugs (or other igniter) which ignites the fuel mixture in the chamber-cap (3). The resulting explosion leads to pressure pilling and a shockwave moving down the chamber causing a deflagration to detonation transition towards the rotor. The resulting force is vectored into the triangular-pyramid shape cut in rotor-recoil disk (1). The pressure against this part of the rotor-recoil disk (1) causes the disk to rotate. As the disk rotates, the side of the disk with the exhaust-extraction cutouts will eventually align with the combustion-chamber for a short period of time. At this moment exhaust can escape through the T-channel (15) near center of the rotor-recoil disk (1) and out to of the engine.

The engine maybe powered with a variety of fuels like most internal combustion engines and similarly, supplies an output of mechanical energy and heat for a variety of applications. One fuel which can be used is hydrogen. In this case hydrogen fuel generating system can be connected to the engine's fuel intake mechanism.

Some Applications of this Engine

This engine can be adapted for use in multiple applications. For example, it can be used to generate heat or energy for locations on and off power grids, thus including remote locations on earth and extraterrestrial (ex. Lunar, Mars and other Space exploration and habitation capabilities). Thus, it can be used to provide heat for homes, businesses, schools and more. It can be used for transportation for powering vehicles in aviation, automotive, marine and more. It can provide energy and heat with a zero carbon emission foot print.

What is claimed is:

1. A shockwave rotor detonation engine comprising:
   a rotor-recoil-disk;
   a chamber-containment disk;
   disk-combustion-containment walls;
   at least one shaft extending beyond said disk-combustion-containment walls;
   chamber-caps;
   ball-bearings;
   combustion chambers;
   wafer gaskets positioned on both sides of the disk-combustion of said rotor-recoil-disk;
   igniters positioned inside of the chamber-caps;
   fuel intake nozzles positioned on the chamber-caps; and
   an exhaust system;
      wherein fuel is injected through said fuel intake nozzles to said combustion chambers;
      wherein at least one of said igniters is positioned within each of said inlet ports to ignite the fuel;
      wherein said exhaust system extracts exhaust gas through a center of said rotor-recoil-disk of the shockwave rotor detonation engine in a uni-directional flow; and
      wherein the shockwave rotor detonation engine is made of at least one of metals or alloys.

2. The shockwave rotor detonation engine according to claim 1,
   wherein said rotor-recoil disk is a cylinder with one or more combustion chamber cutouts extending from an outer edge of said cylinder towards an offset plane vertical centerline and from a top to a bottom;
   wherein the one or more combustion chamber cutouts is of various shapes including one of:
      two triangular-pyramids spanning the full height of the cylinder on opposing sides along a horizontal plane of the rotor-recoil disk;
         wherein a cutout of each of the two triangular-pyramids is angulated from a diameter segment line towards an offset planer vertical centerline of the cylinder;
      a bath-tub shape cutting along the height of the cylinder positioned at a 90 degree angle from the triangular-pyramid cutout;
         wherein a cutout of the bath-tub shape and the cutout of each of the two triangular-pyramids have a broad flat plane cut into the cylinder, transitioning to an arc with a moderate radius to the outer edge of the cylinder;
      one or more holes cutting a horizontal axis to the center of said cylinder and another hole being extended the one or more holes to another side, reaching an opposite side of the broad flat plane of each of the two of the bath-tubed shaped volumes;
         wherein the one or more holes being near the center of the cylinder on one of cylinder ends reaches the one or more holes cut along the horizontal axis in between the broad flat planes of the one or more combustion chamber cutouts; and a T-shaped channel formed said holes which are intersecting in the middle of the part;
wherein the T-shaped channel allows the exhaust gas from the broad flat planes and corresponds bath tub shaped volumes to be removed from rotor-recoil-disk.

3. The shockwave rotor detonation engine according to claim 2,
wherein said rotor-recoil disk consists of different diameters throughout the height of the cylinder;
wherein the diameter of said rotor-recoil disk increases to a maximum where the combustion chamber cutouts and a top of the T-channel are located, which seals said disk-combustion-containment wall; and
wherein when the diameter of said rotor-recoil disk decreases, the diameter of said rotor-recoil disk on the side containing the top of the T-channel is symmetrical the diameter of said rotor-recoil disk on the side containing a bottom of the T-channel.

4. The shockwave rotor detonation engine according to claim 1,
wherein said chamber-containment-disk is a cylinder with a circular hole through the center of said rotor-recoil disk along a vertical height and cutouts of said combustion chambers;
wherein said rotor-recoil disk rotates in said circular hole;
wherein said cutouts of said combustion chambers extend radially from an inside diameter of said chamber containment disk to an outside of said chamber containment disk; and
wherein said cutouts of said combustion chambers include:
a lengthwise dimension, which is offset at an angle form a line parallel to a radius extending from an edge of the cylinder; and
a depth of a volume of each of said combustion chambers extending downward most of the height of the cylinder from a top of said chamber containment disk, thereby ending short of the bottom of the cylinder.

5. The shockwave rotor detonation engine according to claim 1,
wherein a volume of the exhaust gas to rotate said rotor-recoil disk is continuously created as the one or more combustion chamber cutouts on the inside diameter of the chamber containment disk aligns with the cutout of the each of the two triangular-pyramids on an outside of the rotor-recoil disk.

6. The shockwave rotor detonation engine according to claim 1,
wherein each of said chamber-caps is positioned at an edge of said chamber-containment disk and configured as a rectangular cube chamber with an outside width equal to an inside width;
wherein the fuel intake nozzles is positioned to one side of the rectangular cube chamber to distribute the fuel into each of said combustion chambers; and
wherein each of said igniter is positioned to another side of the rectangular cube chamber.

7. The shockwave rotor detonation engine according to claim 1,
wherein said combustion-containment walls are donut shaped and are fastened to the outside of the chamber-containment disk;
wherein an inside diameter of an inner circle cutout of the cylinder wall is substantially equal an outside diameter of the rotor-recoil-disk; and
wherein a seal is provided between the inner circle cutout of the cylinder wall and the outside diameter of the rotor-recoil-disk to prevent the exhaust gases from escaping the combustion chambers.

8. The shockwave rotor detonation engine according to claim 1,
wherein rings of said ball-bearings are positioned in a recess being outside of a combustion-containment wall inner circle and said rotor-recoil-disk;
wherein said rings of said ball-bearings have an inside diameter, which is equal to an outside diameter of the top and the bottom of said rotor-recoil-disk and combustion-containment wall to reduce rotational friction of said rotor-recoil disk.

9. The shockwave rotor detonation engine according to claim 1,
wherein said wafer gaskets are composed of composite heat resistant materials; wherein said wafer gaskets has an outside diameter being equal to the outside diameter of the rotor-recoil disk; and
wherein said wafer gaskets are hold on said rotor-recoil disk and positioned between said chamber containment disk and rotor-recoil disk.

10. The shockwave rotor detonation engine according to claim 1,
wherein said igniters are connected to ignite said fuel in the combustion chambers.

11. The shockwave rotor detonation engine according to claim 1,
wherein said fuel intake nozzles are located at an end of a fuel delivery system and before the chamber-caps to ensure that combustion areas are sealed off from the fuel being delivered.

12. The shockwave rotor detonation engine according to claim 1,
wherein said at least one shaft extending beyond said disk-combustion-containment walls is an output shaft of mechanical energy.

13. The shockwave rotor detonation engine as according to claim 1,
wherein said shockwave rotor detonation engine produces an output having a constant tangential velocity vector and unchangeable internal momentum as being rotating.

* * * * *